Patented June 29, 1948

2,444,399

UNITED STATES PATENT OFFICE 2,444,399

MANUFACTURE OF ETHYLHEXOIC ACID

Bruce Duval and Karl Heinrich Walter Tuerck, Banstead, England, assignors to The Distillers Company, Limited, Edinburgh, Scotland, a company of Great Britain No Drawing. Application October 23, 1946, Serial No. 705,233. In Great Britain October 26, 1945

8 Claims. (Cl. 260—540)

This invention is for improvements in or relating to the manufacture of alpha-ethyl-hexoic acid.

The esters of alpha-ethylhexoic acid have been found to be of considerable utility as solvents and plasticisers particularly for polyvinyl chloride. We have found, however, that alpha-ethylhexoic acid prepared by the oxidation of liquid alpha-ethyl-hexaldehyde obtained by the hydrogenation of alpha-ethyl-beta-propylacrolein with molecular oxygen is intensely coloured, which, of course, limits its use as starting material for the manufacture of plasticisers.

We have now discovered that this discoloration of the reaction product is due to the presence of heptan-3.4-dione, which, even in great dilution, gives rise to an intense yellow-green colour. We have further found, that the presence of the di-ketone in the reaction mixture is due to the fact that some unchanged alpha-ethyl beta-propyl-acrolein remains in the reaction product at the conclusion of the hydrogenation reaction and that this unchanged aldehyde becomes oxidised to the diketone under the conditions used for the oxidation of ethylhexaldehyde.

In our copending application Serial No. 705,234, filed October 23, 1946 there is provided a process for the manufacture of alpha-ethylhexoic acid which comprises treating a mixture of alpha-ethyl hexaldehyde and alpha-ethyl-beta-propyl-acrolein, resulting from the hydrogenatiton of alpha-ethyl-beta-propylacrolein, with molecular oxygen, destroying or removing from the reaction mixture, or an alpha-ethyl hexoic acid fraction thereof substantially all the unsaturated material therein and subjecting the residual saturated material to the action of oxygen in the presence of ultra-violet radiation. The ultra-violet-assisted oxidation step oxidizes the diketone and consequently destroys the colouration in the reaction mixture of the said fraction and thus enables the recovery of a substantially colourless alpha-ethyl hexoic acid to be effected.

According to our invention, there is provided a process for obtaining substantially colourless alpha-ethyl hexoic acid which comprises hydrogenating alpha-ethyl beta-propyl acrolein to produce a reaction product consisting mainly of alpha-ethyl-hexaldehyde together with substantial amounts of beta-ethyl hexanol and subjecting this reaction product, in the liquid phase, to oxidation with molecular oxygen. As alpha-ethylhexaldehyde boils only 10° C. lower than alpha-ethyl-beta-propyl acrolein it is practically impossible, on a technical scale, satisfactorily to separate a mixture of the two aldehydes by mere fractionation. We have found that when alpha-ethyl-beta-propyl acrolein is reduced with the stoichiometrically required amount of hydrogen, a small amount of the alpha-ethyl hexaldehyde produced undergoes reduction to the corresponding alcohol, viz. beta-ethyl-hexanol, with the result that a small amount of the unsaturated aldehyde, namely, alpha-ethyl-beta-propyl acrolein, remains unchanged. By carrying out the hydrogenation, as set forth above, to achieve the formation of substantial amounts of the beta-ethyl hexanol we ensure that substantially complete removal of the alpha-ethyl-beta-propyl acrolein occurs. By "substantial amounts" of beta-ethyl hexanol we mean not less than 1% by weight of the unsaturated aldehyde introduced; in each particular instance the necessary minimum formation of the beta-ethyl hexanol can readily be determined by testing the reaction mixture for the presence of unsaturated material, e. g. by the bromine absorption method, but there is no disadvantage in exceeding this minimum amount since the beta-ethyl hexanol produced is a useful by-product in that it can be utilised for the preparation of esters, e. g. phthalate esters, which can be used as plasticisers. The beta-ethyl hexanol is preferably removed from the ethyl hexaldehyde before oxidation, for example by fractionation, although it may be left in the reaction mixture during the oxidation stage and thereafter removed. On oxidizing the alpha-ethyl hexaldehyde which is free from alpha-ethyl beta-propyl acrolein, a substantially colourless alpha-ethyl hexoic acid is obtained.

The following example illustrates the manner in which the invention may be carried into effect, the percentage figures quoted being calculated by weight.

*Example.*—Colourless alpha-ethyl beta-propyl acrolein, B. P. 172° C./75 mm. Hg, was hydrogenated with Raney nickel at 50° C. till the reaction mixture contained about 20% ethylhexanol and the unsaturation (determined by an ultra-violet spectroscopic method) had disappeared. After filtration to remove the Raney nickel catalyst, the filtrate was fractionated at normal pressure and a fraction, boiling at 162–164° C. and showing less than 0.2% unsaturation, calculated as alpha-ethyl beta-propyl acrolein, was collected. This fraction was oxidized in an agitator vessel with oxygen, without catalyst, at 50–70° C. After 70% of the aldehyde had been oxidised, the reaction slowed down. On distillation of the reaction mixture, a fraction boiling at 108°/7.5 mm./Hg was obtained, which was practically colourless alpha-ethylhexoic acid. The lower boiling alpha-ethylhexaldehyde fraction shows a slight colouration, which rapidly disappears on exposure to sunlight in the presence of air. The thus-purified alpha-ethylhexaldehyde can be returned for oxidation with a succeeding batch. The colourless acid titrated 99.6% strength, and had a refractive index $n_D^{20}$ of 1.4260 and a specific gravity 0.908 at 15°/21° C.

What we claim is:

1. A process which comprises hydrogenating alpha-ethyl beta-propyl acrolein in the liquid phase with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present in excess of 1% of the mixture, and subjecting the alpha-ethyl hexaldehyde in the liquid phase in the absence of a catalyst, to oxidation with molecular oxygen to produce substantially colorless alpha-ethyl hexoic acid.

2. A process which comprises hydrogenating alpha-ethyl beta-propyl acrolein in the liquid phase with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present in excess of 1% of the mixture.

3. A process which comprises hydrogenating alpha-ethyl beta-propyl acrolein in the liquid phase with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present to the extent of about 20% of the reaction product.

4. A process which comprises hydrogenating alpha-ethyl beta-propyl acrolein in the liquid phase with an excess of hydrogen in the presence of a Raney nickel catalyst to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present in excess of 1% of the mixture, and subjecting the alpha-ethyl hexaldehyde in the liquid phase in the absence of a catalyst, to oxidation with molecular oxygen to produce substantially colorless alpha-ethyl hexoic acid.

5. A process which comprises hydrogenating alpha-ethyl beta-propyl acrolein in the liquid phase at a temperature not substantially in excess of 50° C. with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present in excess of 1% of the mixture, and subjecting the alpha-ethyl hexaldehyde in the liquid phase in the absence of a catalyst, to oxidation with molecular oxygen to produce substantially colorless alpha-ethyl hexoic acid.

6. A process which comprises hydrogenating alpha-ethyl beta-propyl acrolein in the liquid phase at a temperature not substantially in excess of 50° C. with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being present to the extent of about 20%, and subjecting the alpha-ethyl hexaldehyde in the liquid phase in the absence of a catalyst, to oxidation with molecular oxygen to produce substantialy colorless alpha-ethyl hexoic acid.

7. A process which comprises hydrogenating alpha-ethyl beta-propyl acrolein in the liquid phase with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present in excess of 1% of the mixture, subjecting the alpha-ethyl hexaldehyde in the liquid phase in the absence of a catalyst, to oxidation with molecular oxygen to produce substantially colorless alpha-ethyl hexoic acid, and thereafter fractionally distilling the alpha-ethyl hexoic acid to free it from alpha-ethyl hexaldehyde.

8. A process which comprises hydrogenating alpha-ethyl beta-propyl acrolein in the liquid phase with an excess of hydrogen to produce a reaction product consisting substantially of alpha-ethyl hexaldehyde and beta-ethyl hexanol and until there is substantially no unsaturation, said alpha-ethyl hexaldehyde being the major constituent and said beta-ethyl hexanol being the minor constituent but present to the extent of about 20% of the reaction product, and subjecting the alpha-ethyl hexaldehyde in the liquid phase at a temperature of about 50 to 70° C. in the absence of a catalyst, to oxidation with molecular oxygen to produce substantially colorless alpha-ethyl hexoic acid.

BRUCE DUVAL.
KARL HEINRICH WALTER TUERCK.

REFERENCES CITED

The following references are of record in the file of this patent:

UNITED STATES PATENTS

| Number | Name | Date |
|---|---|---|
| 2,060,267 | Toussaint | Nov. 10, 1936 |
| 2,115,892 | Toussaint | May 3, 1938 |
| 2,150,158 | Gallagher et al. | Nov. 10, 1936 |